Jan. 30, 1962 E. G. BECK 3,018,543
CHAMBERED SHEET METAL LAMINATES AND METHOD OF MAKING
Filed July 13, 1955 3 Sheets-Sheet 1

INVENTOR.
Edward G. Beck.
BY
Wood, Herron & Evans.
ATTORNEYS.

Jan. 30, 1962     E. G. BECK     3,018,543
CHAMBERED SHEET METAL LAMINATES AND METHOD OF MAKING
Filed July 13, 1955     3 Sheets-Sheet 2

INVENTOR.
Edward G. Beck.
BY
Wood, Herron & Evans.
ATTORNEYS.

Jan. 30, 1962 E. G. BECK 3,018,543
CHAMBERED SHEET METAL LAMINATES AND METHOD OF MAKING
Filed July 13, 1955 3 Sheets-Sheet 3

INVENTOR.
Edward G. Beck.
BY
Wood, Herron & Evans.
ATTORNEYS.

United States Patent Office 3,018,543
Patented Jan. 30, 1962

3,018,543
CHAMBERED SHEET METAL LAMINATES AND
METHOD OF MAKING
Edward G. Beck, Fort Thomas, Ky., assignor to The
Stolle Corporation, Cincinnati, Ohio, a corporation of
Ohio
Filed July 13, 1955, Ser. No. 521,677
20 Claims. (Cl. 29—157.3)

This invention relates to improved, integral, chambered sheet metal laminates and to a method of making them. These laminates may be fabricated from sheets of aluminum, steel, copper, nickel, titanium and other metals which can be bonded together interfacially, and also from various alloys of these metals. The chambered laminates of this invention may be utilized for many industrial purposes, but the invention is specifically disclosed in relation to the fabrication of an improved aluminum heat exchanger of the general type which is suitable for use as an evaporator in a refrigerating system.

The term "chambered, sheet metal laminate" is utilized herein to designate a fabricated sheet metal structure which comprises a plurality of metal sheets which are bonded together to constitute an integral laminated structure over part only of their facial areas, the remaining or unbonded areas being separated to provide spacing between the sheets. In this description, the areas in which the sheets are spaced are called "chambers" generically, regardless of the configuration of the areas. The term therefore comprehends and includes all passageways, flutes, corrugations, etc. which impart relief or profile to an exterior surface of the sheet metal laminate.

The over-all method of this invention involves the novel concept of fabricating chambered sheet metal structures in a single operation from a type of sheet metal laminate, which in the vernacular of the art is called a "sandwich sheet." A sandwich sheet is constituted by two or more sheets of metal bonded together over opposed areas by a metal interlayer or bonding core. The invention will be described in relation to a sandwich sheet which is bonded by the metal interlayer over the entire interfacial areas of the bonded sheets.

This interlayer or bonding core is designated herein as a "brazing core" to indicate that the core must have a lower melting point or range than the melting point or range of the metals of the bonded sheets. The term is used broadly to include any bonding core having a melting point or range lower than the melting point or range of the bonded sheets, regardless of whether or not its melting range is above or below the arbitrary temperature which is used to distinguish brazing from soldering. Hence, the term "brazing core" as used herein includes an interlayer of bonding metals and alloys which for other purposes may be defined as solders.

The brazing core may be a lower melting point alloy of the dominant metal of the bonded sheets or it may be any one of the lower melting point metals or alloys which are commonly used or known for conventional brazing or soldering of the dominant metal of the bonded sheets. The sandwich sheet may be fabricated by any of the standard or known bonding methods and techniques. For example, separately fabricated wrought laminas (sheets, layers or slabs) of the metals or alloys to be bonded and the brazing core, or bonding metals or alloys, may be interfacially stacked or assembled in sandwich relationship and then integrally united interfacially by a pressure bonding operation, such as by rolling, forging or similar metal working step or steps, to thereby reduce the overall thickness of the laminate and proportionally reduce the initial thicknesses of the several laminas with accompanying elongation of the sandwich product.

Alternatively, a casting technique may be employed in combination with a rolling or forging operation for producing sandwich products which are suitable for use in the practice of this invention. By way of example of this particular technique, a bonding metal or alloy would be cast between spaced sheets or plates of the metals or alloys to be bonded together to provide a composite ingot of suitable thickness relationship between the outer and inner layers of the ingot, and the composite body thereafter reduced in thickness and elongated by rolling or forging to desired sandwich sheet proportions. The initial composite ingot could also be made by casting the outer metals or alloys in contact with the opposite faces of a prefabricated slab or sheet of bonding metal and thereafter reduced by working the same to final sandwich sheet requirements.

In addition to the two above generally described techniques, one or more metal slabs or sheets may be plated, dip coated, or otherwise provided on one major flat surface with a superficial layer of bonding or brazing metal or alloy and thereafter pressure bonded to a second metal or metal alloy sheet with the bonding layer in interleaved relationship.

Depending on the metallurgical characteristics of the several laminas making up a sandwich sheet, surface preparation or treatment of one or more of the interfacial contacting surfaces may be required to insure a unitary bond therebetween. Similarly, it may be required to perform the pressure bonding step within the hot working temperature range for the laminas in a specific instance.

The invention will be explained primarily in relation to a sandwich sheet which is constituted by two outer sheets bonded together interfacially by a brazing core, but the invention also comprehends the utilization of a five-ply sandwich sheet which is constituted by a center sheet bonded interfacially to two outer sheets by two brazing cores, one between the center sheet and each outer sheet. The term "sandwich sheet" therefore distinguishes the sheet metal laminates which are used in the practice of this invention from other known laminates such as two-ply laminates. The outer sheets of the sandwich sheet may be of the same thickness or of different thickness and also may be constituted by the same metal or alloy or different metals or alloys.

Since the brazing core of a sandwich has a lower melting point than the sheets which it bonds, there is a temperature range in which the brazing core is relatively fluid in comparison with the bonded sheets. This temperature range in which the brazing core is relatively fluid and the bonded sheets are relatively solid is designated herein as "brazing temperature."

This invention is predicated upon the discovery and determination that if a sandwich sheet is heated to brazing temperature while positively confined between two dies having one or more cavities therein, the bonded sheets can be separated in the cavity areas by the application of fluid pressure to the relatively fluid metal of the brazing core between the sheets in these areas. This operation involves disrupting the brazing core in the selected areas, drawing the metal of one or both of the bonded sheets to separate the sheets, expanding the metal to fill out into the cavity or cavities, and thereby providing one or more chambers in the laminate.

The disrupting and expanding operation is most easily accomplished by the use of a gas under pressure, although for some purposes the use of liquids under pressure may be desirable. The gas may be atmospheric air, nitrogen, oxygen, argon, hydrogen, carbon dioxide, propane, or any of the other commonly available commercial gases, or compatible mixtures thereof. The gas may be chosen with regard to availability, cost, and chemical action in respect to the metals being processed. Superheated steam may also be used if desired.

In fabricating structures which do not require great accuracy as to the precise dimensions of the chamber, it is not necessary to machine the dies to provide accurate mold cavities. Mere hollowing out of a die surface to provide clearance for the expansion of metal may be all that is necessary. However, for laminates produced in quantity, where uniformity and dimensional accuracy are necessary, the dies preferably are provided with cavities which limit the expansion of the outer sheets of the sandwich sheet in response to the fluid pressure applied to the brazing core.

Either one or both dies may be configurated or provided with mold cavities. Hence, the finished laminate may have one configurated surface and one unconfigurated surface, or both surfaces may be configurated. The configurations on the opposite surfaces may or may not register, thus permitting fabrication of laminates having chambers with one expanded wall and one unexpanded wall, or chambers having walls which are expanded on both sides of the sheet.

In performing the operation of disrupting the brazing core by fluid pressure and drawing and expanding the outer sheets of the sandwich over the disrupted areas, the confining force of the dies preferably should be greater than the expanding fluid force in order to limit the internal disruption of the sandwich sheet to the unconfined areas.

In general, the disruption of the molten brazing core requires less pressure than the further expansion of the metal of the outer sheets to fill the mold cavities. On this account the pressure must be applied so as to rip the sheets apart progressively over the unconfined areas, but the pressure must be applied against a dead end which confines the fluid and permits pressure to build up to further expand the metal sheets. The pressure of the dies must also be sufficiently great to immobilize the brazing core and prevent lateral leakage of the gas between the sheets.

At present, chambered sheet metal laminates are produced by processes which do not utilize sandwich sheets as the starting material and, hence, have no brazing core. In such structures the bond between the sheets over their laminated areas is in the nature of a weld. Hence, the chambers of an expanded duplex product inherently are characterized by sharp angular edges or notches. This characteristic tends to give rise to failure from fatigue and otherwise presents a condition of concentrated stress in the structure. Also, if the laminate is used as a heat exchanger of chemical substances, the notches provide foci for corrosion and sedimentation.

The preferred specie of chambered sheet metal laminate of this invention, on the contrary, is characterized by chamber margins which are constituted by fillets of brazing core metal which cover and round out the joints between the bonded sheets. Otherwise expressed, the marginal areas of the flared chamber walls are brazed together by fillets of brazing core metal which are integral with the brazing core between the sheets over their unexpanded areas. The fillets provide a stronger structure and eliminate all disadvantages incidental to the use of chambers having sharply angulated margins along the joints of the bonded sheets of the laminate. The degree of fillet formation depends somewhat on the thickness of the brazing core and on the die pressure employed. The combination of a relatively thick brazing core and a relatively high die pressure tends to produce a relatively heavy fillet. On the other hand, the fillet formation, while preferred, is not necessary, and the invention may be practiced with brazing core thicknesses and die pressures which produce little, if any, fillet formation.

Reference is now made to the following detailed description of the drawings in which.

The starting material in the practice of the method of this invention may consist of two, three or more metal sheets which are bonded together interfacially by brazing material into the form of a sandwich. For the purpose of illustration, a two-ply sheet, as shown in FIGURE 1, may consist of two outer sheets of metal 10 and 11 which are bonded together by a metallic brazing core 12.

Figure 1:
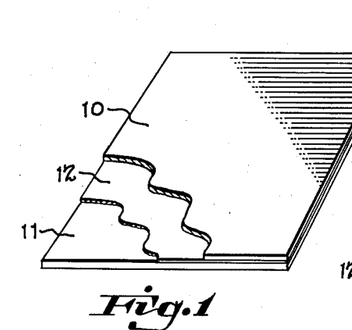
FIGURE 1 is a diagrammatic perspective view which is broken away to illustrate the construction of a three-ply sandwich sheet, constituted by two outer sheets of metal bonded together by a metallic brazing layer or core, which may be used as the starting material in the practice of the method of this invention.
Figure 6:
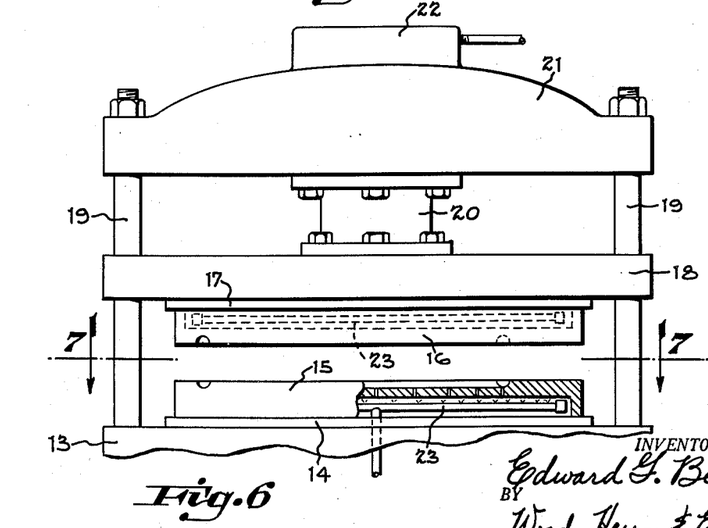
FIGURE 6 is a front elevational view of a press which is suitable for use in the practice of the invention.

In practicing the method of this invention the sandwich sheet of FIGURE 1 is placed in a press which may be of the type shown diagrammatically in FIGURE 6. It will be apparent that many different types of presses are available which are satisfactory for the practice of this invention. The press shown consists of a bed 13 having a bolster plate 14 thereon, which mounts a lower die designated 15. An upper die 16 is mounted under a bolster plate 17 which is attached to a movable head 18 directly above lower die 15 so that the upper die can be brought down on top of the lower die to confine the sandwich sheet between the two dies. Movable head 18 may be guided by means such as the guide posts shown at 19—19. A hydraulically operated ram 20 mounted within a cylinder 22 may be employed to exert the pressure necessary to confine the sandwich sheet between the two dies. The hydraulic cylinder 22 for actuating ram 20 is shown supported within or carried by a stationary yoke or head 21 of the press. Since the practice of the invention involves elevating the temperature of the sandwich sheet embraced between the upper and lower dies 15 and 16, respectively, thermal insulation (not shown) is preferably installed between the dies and the bolster plates 14 and 17 to avoid undue heat conduction into the press proper.

It is preferred that both dies 15 and 16 be heated; for example, by means such as gas burners shown diagrammatically at 23—23. The two dies are hollow, as indicated, in order to accommodate the burners. The burner installed in the movable upper die may be connected to the gas source by a flexible hose (not shown). In the practice of the invention the dies may be heated by any known means, including electrical induction means if desired. The only limitation placed upon the type of heating means employed is the need to raise a sandwich sheet confined between the two dies to a temperature which is within the brazing temperature, as determined by the material used for bonding the sheets comprising the sandwich.

The sandwich sheet need not be heated to brazing temperature over its entire area. It is only necessary that the areas which are to be expanded be heated to brazing temperature. Marginal areas of the sandwich sheet may extend beyond the dies or the dies may be heated in relation to the design of the chambered laminate to conserve heat by concentrating it in the areas of the sandwich sheet which are to be expanded. Such differential heating also tends to minimize the danger of lateral blowout through the softened brazing core.

Figure 7:
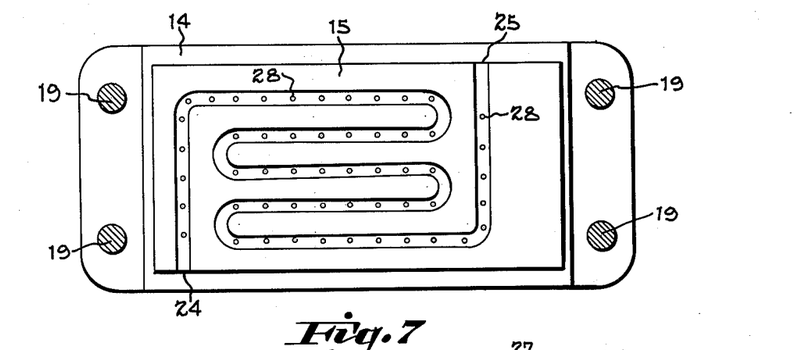
FIGURE 7 is a cross-sectional view taken on the line 7—7 of FIGURE 6, showing the lower one of the two dies of the press of FIGURE 6.

The dies 15 and 16 present opposed faces for engagement with the outer surfaces of a sandwich sheet disposed there between, one or both of the opposed die faces being preferably provided with one or more cavities which determine the dimensions and configurations of the outer surfaces of the processed article. In FIGURE 7, for example, which shows the face of lower die 15, the cavity consists of a continuous channel which starts at the front of the die adjacent to one side, as at 24, extends toward the rear of the die, then through a series of reverse turns, to terminate at the rear edge of the die at the opposite side, as at 25. If it is desired to fabricate an expanded sandwich sheet in which the chamber, following the configuration shown in FIGURE 7, is desired on one side only, then the upper die 16 may be substantially planar except at the places corresponding to the two outer ends of the chamber to be formed. In this case, the upper die may have two cavities therein to provide short entry channels, such as the one indicated at 26 in FIGURE 8, above each end 24 and 25 of the cavity in upper die 16 to accommodate injection nozzles of the type shown generally at 27.

The brazing core may be disrupted and the sheets expanded by applying fluid pressure to the confined area of the brazing core from one end of the passageway or both. If only one injection nozzle is utilized, the other end of the passageway is plugged to prevent the fluid pressure from exhausting to atmosphere. The point is that the fluid pressure must be injected from both ends of the passageway or against a dead end so that the initial disruption of the brazing core and parting of the sheets does not vent the pressure. The fluid pressure within the laminate must not only rip or disrupt the brazing core progressively, but expand the outer sheets to fill the mold cavity or cavities.

If, on the other hand, it is desired to provide a sheet in which the chamber is symmetrically expanded on both sides of the sandwich sheet, following the configuration shown in FIGURE 7, then the upper die would have a channel-shaped groove in its face which is the mirror image of the one shown in FIGURE 7. In order to prevent entrapment of air within the mold cavities by the outer sheet expanded thereinto, small apertures such as those shown at 28 extend through the dies to vent the mold cavities to the atmosphere. It is also preferred to similarly vent the flat planar surface of a die devoid of cavitation to insure against air entrapment between the exterior flat outer surface of a sandwich product and its contacting planar die surface.

Figure 9:
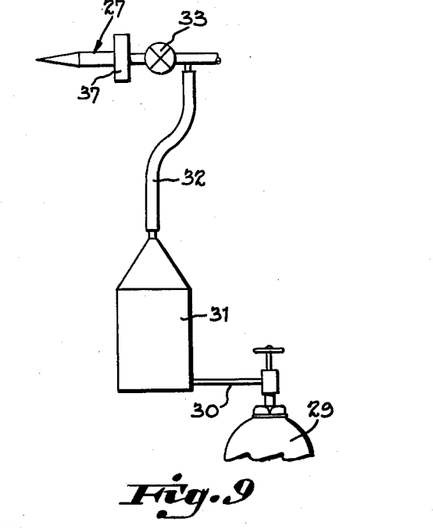
FIGURE 9 is a diagrammatic side elevational view showing the general nature of apparatus which may be used to expand a sandwich sheet which is confined between dies.

After the sandwich sheet of FIGURE 1 is clamped between the dies of the press of FIGURE 6 and is heated to brazing temperature, the outer sheets are expanded into the mold cavities by application of fluid or gas pressure. The system for applying fluid or gas pressure is shown diagrammatically in FIGURE 9 and comprises a tank 29 which holds the expanding medium under pressure. The tank is connected through a release valve by a conduit 30 to a vessel or preheating furnace 31 in which the expanding medium is heated by heating means (not shown). This heating chamber is connected by conduit 32 to an injection nozzle 27, an adjustable control valve 33 being provided to insure the desired degree of expanding pressure at the nozzle 27.

Figure 8:
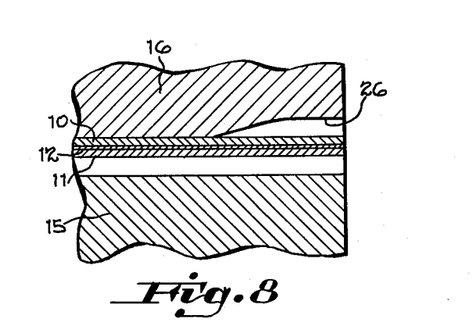
FIGURE 8 is a fragmentary cross-sectional view showing the edgewise portions only of a pair of upper and lower dies between which a three-ply sandwich sheet is confined.
Figure 10:
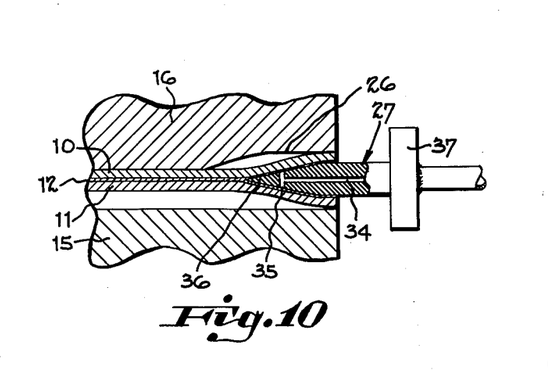
FIGURE 10 is a view similar to FIGURE 8, showing an injection nozzle being inserted into the sandwich sheet.
Figure 11:
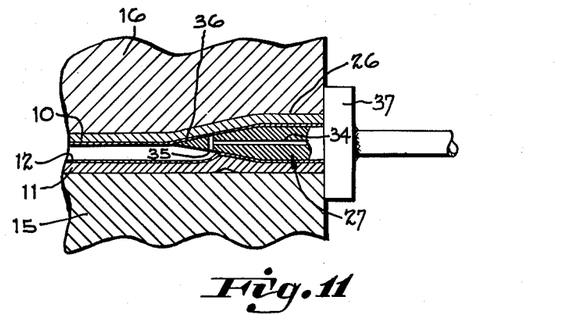
FIGURE 11 is a fragmentary cross-sectional view similar to FIGURE 10 in which the injection nozzle is in seated position and fluid pressure has been applied to expand one of the outer metal sheets with respect to the other.

As disclosed in FIGURES 10 and 11, the portion of the injection nozzle 27 which penetrates the brazing core of the sandwich sheet includes a longitudinal passageway 34 which connects with the expanding medium under pressure and a transverse passageway 35 at right angles to the longitudinal passageway, the expanding gas or fluid being discharged or ejected from the nozzle through the transverse passageway. The injection nozzle is preferably conical and terminates in a sharp point 36, the transverse passageway being spaced rearwardly of the point. The transverse passageway of the injection nozzle may be connected to the outside on one side only of the nozzle if one side only of the sandwich sheet is to be expanded. While FIGURES 8, 10 and 11 diagrammatically illustrate the expansion of but one side of the sandwich sheet, the nozzle appropriate for expanding one or both sides is disclosed and may be used. The injection nozzle is also provided with a collar 37 which serves as a stop when the injection nozzle is fully seated, and which preferably bears against the lateral edge of the sandwich sheet to reduce leakage of pressure to the outside. The collar 37 may also bear against the upper and lower die edges, as illustrated to best advantage in FIGURE 11.

FIGURES 8, 10 and 11 illustrate in detail one means for applying expanding pressure to the softened brazing core of a sandwich sheet held between the dies, but it is to be understood that other designs of nozzles may be employed both for injecting from the edge of the sandwich sheet and for inflating by surface perforation of one of the outer dominant sheets of the sandwich. The application of the expanding medium to those areas of the sandwich sheet which are not confined in the first instance between the opposed surfaces of the dies in contact with the sandwich sheet therebetween causes the formation of the channels between the two outer metal sheets of the sandwich.

Figure 3:
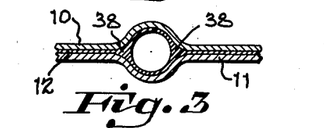
FIGURE 3 is a fragmentary cross-sectional view showing a chamber formed in a three-ply sandwich sheet in which the chamber projects symmetrically from both sides of the sandwich product.
Figure 4:
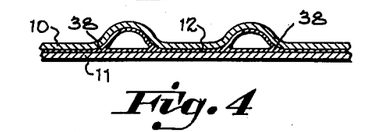
FIGURE 4 is a fragmentary cross-sectional view showing two asymmetrical chambers formed in a three-ply sandwich sheet, the chambers projecting from one side only of the sandwich sheet.
Figure 5:
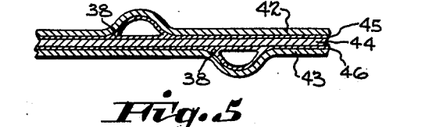
FIGURE 5 is a fragmentary cross-sectional view showing an asymmetrically expanded five-ply sandwich sheet, the plies being constituted by two outer and an intermediate sheet of metal bonded together by two metallic brazing layers or cores.

In addition, the expanding operation may be accompanied by the formation of fillets, such as those indicated at 38—38 in FIGURE 3, which are formed by the surface tension and/or capillary flow of the fluid brazing core material. These fillets form at the places where the expanded metal is drawn away from the plane of the core and fill the junctures, rounding out and strengthening them. It will be noted that fillets are also provided in the asymmetrically formed channels which are shown in FIGURES 4 and 5. Whether or not the aforementioned fillets are formed in the practice of the invention is dependent on the thickness of the brazing core and die pressures employed during an expansion operation.

Typical end products of the practice of the method of the invention are illustrated in FIGURES 2, 3, 4, 5, 12 and 13. Also, FIGURE 7, the plan view of the configurated die, indicates an additional possible configuration which is somewhat like that of FIGURE 2.

Figure 2:
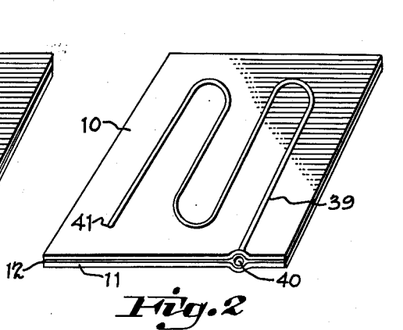
FIGURE 2 is a perspective view of the sandwich sheet after being processed by the method of this invention.

FIGURE 2 illustrates the sandwich sheet of FIGURE 1 after expansion, with outer metal sheets 10 and 11 joined by a brazing core 12 which bonds the outer sheets to provide a flat laminate over a major unchambered area and a configurated chambered area in the form of an articulated passageway 39. As disclosed, the passageway is open at the edge 40 of the expanded sandwich sheet where the expanding medium was injected, but the other end of the passageway is closed as at 41. If a through passageway is desired, the sheet may be trimmed to remove the blind end of the passage or it may be tapped by surface puncture or perforation. The general type of configuration of the chamber disclosed in FIGURE 2 may be formed by an expansion of one outside sheet or both outside sheets. FIGURE 2 is intended to illustrate the latter.

The chambered laminate (not shown), which would result from the practice of the method of the invention with the configurated die disclosed in FIGURE 7, would have an asymmetrical passageway, that is, a passageway formed by expansion of one outer sheet only.

The detailed sectional views of FIGURES 3, 4, and 5 illustrate diagrammatically the general cross-sectional configurations of typical flutes or passageways which may be formed in the sandwich sheet, including the fillets at the margins of the chambers.

Except for FIGURE 5, the disclosure has been more or less specifically directed to the use of a simple sandwich sheet which is constituted by two outer sheets of metal and a bonding or brazing core in between. FIGURE 5, however, discloses a structure which is constituted by two outer sheets designated 42 and 43, respectively, a central sheet 44, and two brazing cores 45 and 46, one between each outside sheet and the central sheet. The technique of fabricating this more complex type of sandwich sheet is the same as that used for the simpler sandwich sheets. Structures of the type illustrated in FIGURE 5 may be used, for instance, for interchanging heat between two fluids each of which is circulated through its own passageway. In such case, the unexpanded central portion of the sandwich sheet serves as an extended radiator fin which is common to both passageways.

Figure 12:
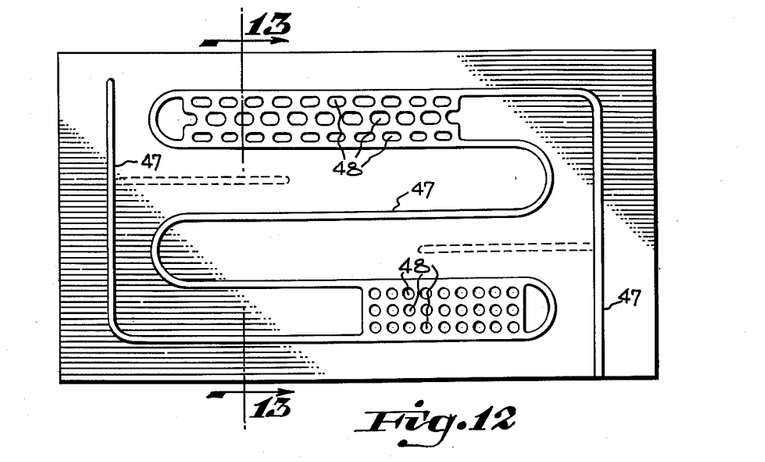
FIGURE 12 is a plan view of a heat exchanger fabricated in accordance with the principles of the invention.
Figure 13:
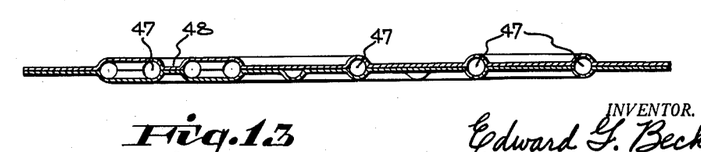
FIGURE 13 is a cross-sectional view taken on the line 13—13 of FIGURE 12.

FIGURES 12 and 13 disclose a laminate having a more intricate chambered design than the laminate of FIGURE 2. This structure combines relatively narrow passageways 47 with heat exchange areas which are constituted by a labyrinth of passageways, that is, areas characterized by a plurality of bonded islands 48 which are surrounded by open chambers. The exact design disclosed in FIGURES 12 and 13 constitutes no part of this invention, the illustration being provided merely to indicate the intricacy of the chamber patterns which may be produced by the method of this invention.

The exact temperatures and pressures employed in the practice of the method of the invention depend entirely upon the nature of the metals and/or alloys which are utilized to constitute the initial sandwich sheet as well as upon the bonding properties of the brazing core. As a generality, the temperature must be such that the brazing core is relatively fluid, or molten, or plastic, so that it is more readily disruptable than the outer sheets. The operation must be performed at a temperature below the melting point of the metal of the outer sheets of the sandwich, but within a temperature range in which the outer sheets may be expanded by the injected expanding pressure. The permissive die pressure depends upon the degree of deformation which is tolerable, and the degree of expanding pressure required depends upon the workability of the outer sheets at the brazing temperature. All these factors must necesarily be correlated in relation to the materials of the starting sandwich sheet and design of the expanded laminate to be produced. It is essential, therefore, to properly correlate and balance die hold-down and expanding pressures to meet the operating brazing temperature requirements for each particular sandwich sheet product.

Although the invention may be practiced with a great variety of sandwich sheets, the invention is disclosed specifically in relation to an aluminum sandwich sheet having an aluminum alloy core such as that disclosed in United States Patent No. 2,602,413, issued July 8, 1952, on the application of Mike A. Miller, for "Aluminous Brazing Product and Method of Brazing."

The term "aluminum" as used in the description of the metal sheets forming the sandwich is intended to include sheets made of pure aluminum, as well as aluminum base alloys, which are exemplified by the following nominal compositions, on a weight basis:

(1) 1.25% manganese+balance substantially aluminum.
(2) 0.65% magnesium+0.35% silicon+0.25% copper +balance substantially aluminum.

The term "aluminum alloy bonding core" as used is intended to include, but without limitation, alloys of aluminum having the following nominal compositions, on a weight basis:

(1) 5.0% silicon+balance substantially aluminum.
(2) 7.5% silicon+balance substantially aluminum.
(3) 12.0% silicon+balance substantially aluminum.

The total thickness of the sandwich sheet which is suitable for use in the practice of this invention may vary over a very wide range. For evaporators for electrical refrigerating systems the sandwich sheets constituted from the aluminous materials referred to immediately above may have a total thickness of substantially 0.060 inch to 0.085 inch and higher. The brazing core, on the other hand, may have a thickness of from .0002 inch to .025 inch. In general, the thinner the brazing alloy layer, the higher the surface tension force developed between the molten brazing alloy and its outer bonded sheet members embracing and confining the brazing alloy; and it has been experienced in actual practice with aluminous sandwich sheet products of the type and composition mentioned above that internal expansion of such products is possible without detrimental lateral exudation of the molten brazing core alloy. Good results have been obtained from the fabrication of laminates suitable for refrigerator evaporators from a sandwich sheet, the outer sheets of which are constituted by an aluminum alloy containing 1.25% manganese and an inner core of aluminum-silicon alloy containing 7.5% silicon, the total thickness of the laminate being 0.081 inch and the thickness of the aluminum-silicon alloy core being 0.008 inch or substantially 10% of the total thickness of the laminate.

The brazing temperature for aluminum-silicon alloy brazing cores varies with the amount of silicon in the alloy, the melting range increasing as the amount of silicone present is decreased. The general brazing temperature range which is suitable for expanding an aluminum sandwich sheet bonded by the aluminum-silicon alloys mentioned above is substantially 1070° F. to 1160° F.

Specific aluminum expandible members and brazing core alloys have been given as responding to the method of this invention. Manifestly, the specific compositions herein disclosed are not to be taken as a limitation on the scope of the invention, replacements, substitutions and entirely different aluminum compositions being capable of providing aluminum sandwich products which would fulfill the requirements of the invention. For example, presently available aluminum base alloys containing one or more of the alloying elements, copper, zinc, magnesium and silicon, could be employed for the outer expandible members of the sandwich products, and the brazing core bonded thereto could be similarly selected from one or more of the elements, zinc, copper, germanium, and magnesium, in addition to or substitution for the silicon so long as the temperature differential is maintained to permit the presence of the plastic or fluid brazing layer and stiff workable outer layer requirements of the invention. The aluminum or aluminum alloy sheets of the sandwich sheet may also be bonded together by lower melting point metals and alloys other than alloys of aluminum. For instance, zinc may be used as the bonding core or various known zinc alloys may be so used. The identities of the components of such zinc alloys are not critical and may be chosen to provide a desired melting range and bonding action. It is well recognized that zinc-aluminum alloys containing 50 to 98 parts zinc by weight may be readily bonded to aluminum and aluminum alloy sheets by pressure bonding. Bonding alloys and techniques which may be used in farbricating aluminum sandwich sheets having zinc brazing cores are generally disclosed and described in the following United States patents:

No. 1,985,784, Jordan, December 25, 1934.
No. 2,100,255, Larson, November 23, 1937.

Various expanding media may be used for expanding the sandwich sheet material contemplated within the scope of the invention. In the case of aluminous sandwich products, it is preferable to employ a gas which does not react readily with the aluminous constituents at brazing temperature. Argon and nitrogen are particularly recommended for expanding aluminum sandwich sheets. Before being injected into the core of the sandwich sheet, the gas is preferably heated to the lowest melting temperature of the brazing core, which may be as low as 1070° F., if a low melting point aluminum-silicon alloy is used as the brazing core.

The pressure necessary for injecting the expanding medium varies with the bonding power or surface tension developed by the brazing core and the stiffness or degree of workability of the metal of the outer sheets of the composite sandwich products. The former varies with the metal or alloy used as the brazing core and the latter with the thickness and workability of the outer sheets. An aluminum saidwich sheet of 0.060 inch thickness and having an aluminum-silicon brazing core of 1½% of the aforesaid total laminate thickness was expanded to produce a 12 inch by 24 inch refrigerator evaporator unit provided with an asymmetrical fluted passage, substantially as shown in FIGURE 7, under an application of 150 pounds per square inch maximum expanding pressure and 550 pounds per square inch hold-down die pressure. Increasing the thickness of the aforesaid sandwich sheet to 0.081 inch, the expanding pressure was increased to a maximum of 300 pounds per square inch. In either of the above cases and in the practice of the invention, regardless of the particular metals or alloys constituting outer and brazing core elements of the starting sandwich material, it is preferred to introduce the internal disrupting and expanding pressure progressively, increasing the initial pressure during the operation to the predetermined maximum pressure required to expand the sheets without causing lateral exudation of the brazing core metal at the temperature of operation of the method of the invention. It is also desirable to release and exhaust the internal expanding pressure in advance of releasing the die or hold-down pressure confining the expanded products of the invention, and application of a suitable lubricant on the die surfaces and/or sandwich product surfaces in contact therewith is recommended in order to facilitate removal from the die.

The sandwich sheets which may be used in the practice of this invention may be fabricated individually or by mill processes producing sheet of indeterminable length, such as by rolling in a rolling mill or mills. If the sandwich sheets are fabricated individually, the metal sheets may be cut to size before bonding and, if desired, one or both sheets may extend beyond the overlap which provides the opposed faces. It is contemplated, however, that this invention may best be practiced with sandwich sheets which are produced as rolling mill products and then shipped to the fabrication plants where the individual sandwich sheets may be cut to size and expanded to the articles desired. In any case, the laminae of the sheets are bonded over their entire interfacial areas. A press of the type disclosed diagrammatically herein is adapted to fabricate the sandwich sheets into chambered laminates in quantity production.

While the disclosure herein has been directed primarily to chambered laminates which are fabricated from aluminum sandwich sheets, it is to be understood that a variety of metals and alloys may be used in the method of this invention. A wide range of methods and techniques of bonding dissimilar metals are well known and in common used and may be utilized for the fabrication of the sandwich sheets. For instance, Engineering Laminates, edited by Albert G. H. Dietz, published by John Wiley and Sons, Inc., New York, in 1949, discusses sandwich sheets, techniques of fabricating them, and techniques of bonding laminates generally.

The metal bonding techniques which are suitable for the fabrication of laminates generally, may be utilized to fabricate sandwich sheets which are suitable for use in the practice of the method of this invention. Thus, the invention may be practiced to expand sandwich sheets which are fabricated from a wide range of metals and alloys, wherein the metal and alloy outer sheets provide the required stuctural rigidity and the relatively thin, lower melting point, brazing core bonds the outer sheet prior to the expanding operation. Regardless of the technique by which the initial sandwich sheet is bonded, outer sheets of the finished chambered laminate are truly brazed together over the unchambered areas, inasmuch as the method involves the softening of the brazing core to brazing temperature and the compression of the brazing core between the outer sheets of the laminate at brazing temperature. Thus, the end products of this invention are chambered, brazed, sheet metal laminates which may be used as heat exchangers or for any other desired purpose.

Having descibed my invention, I claim:

1. The method of fabricating an integral, chambered sheet metal laminate from a metal sandwich sheet constituted by at least two sheets of metal bonded together by a brazing core over opposed facial areas of the sheets, said method comprising heating the sandwich sheet to brazing temperature and confining part of the surface area thereof between dies to maintain the bond between the brazing core and the sheets over the areas thus confined, and disrupting the brazing core over the remaining area by applying fluid pressure between the metal sheets to separate them while maintaining the sheets at brazing temperature.

2. The method of fabricating an integral, chambered sheet metal laminate from a metal sandwich sheet constituted by at least two sheets of metal bonded together by a brazing core over opposed facial areas of the sheets, said method comprising heating the sandwich sheet to brazing temperature and confining part of the surface area thereof between the faces of dies, at least one of which has at least one mold cavity therein, and disrupting the brazing core over the remaining areas by applying fluid pressure between the metal sheets to separate them and expand them to fill the mold cavity while maintaining the sheets at brazing temperature.

3. The method of fabricating an integral, chambered sheet meal laminate from a metal sandwich sheet constituted by at least two sheets of metal bonded together by a brazing core over the entire facial areas of the sheets, said method comprising heating the sandwich sheet to brazing temperature, applying braze-maintaining pressure to selected areas of said sheets, and expanding the outer sheets over the remaining area by applying fluid pressure between the sheets throughout the areas not subjected to the braze-maintaining pressure while maintaining the sheets at brazing temperature, thereby to provide a chambered structure.

4. The method of fabricating an integral, chambered sheet metal laminate from a metal sandwich sheet constituted by at least two sheets of metal bonded together by a brazing core over opposed facial areas of the sheets, said method comprising pressing the sandwich sheet at brazing temperature between dies having faces which compact the sheets in brazing engagement over selected areas, at least one of said dies having at least one die cavity which permits limited separation of the sheets, and disrupting the brazing core and expanding a sheet into a die cavity by applying fluid pressure to the fluid brazing core over the area of the die cavity while maintaining the sheets at brazing temperature.

5. The method of fabricating an integral, chambered sheet metal laminate from a metal sandwich sheet constituted by at least two sheets of metal bonded together by a brazing core over the entire facial areas of the sheets, said method comprising confining part of the surface areas of the sandwich sheet between dies which are heated to brazing temperature to elevate the temperature of the sandwich sheet to brazing temperature, the pressure between dies being sufficient to maintain the sheets in brazing engagement, then applying fluid pressure to the softened metal of the brazing core of the sandwich sheet over the unconfined areas to separate the sheets while maintaining the sheets at brazing temperature, exhausting the said fluid pressure, and removing the sandwich sheet from the dies.

6. The method of fabricating an integral, chambered sheet metal laminate from a metal sandwich sheet constituted by at least two sheets of metal bonded together by a brazing core over opposed facial areas of the sheets, said method comprising confining part of the surface areas of the sandwich sheet between dies which are heated to brazing temperature to elevate the temperature of the sandwich sheet to brazing temperature, the pressure between dies being sufficient to maintain the sheets in brazing engagement, heating a gas to brazing temperature and applying the gas under pressure to the softened metal of the brazing core of the sandwich sheet over the unconfined areas to separate the sheets, exhausting the gas pressure applied to the sandwich sheet, and removing the sandwich sheet from the dies.

7. The method of fabricating an integral, chambered sheet metal laminate from a metal sandwich sheet constituted by at least two sheets of metal bonded together by a brazing core over the entire facial areas of the sheets, said method comprising confining part of the surface areas of the sandwich sheet between dies which are heated to brazing temperature to elevate the temperature of the sandwich sheet to brazing temperature, the pressure between dies being sufficient to maintain the sheets in brazing engagement, at least one of said dies having a facial mold cavity therein, heating a gas to brazing temperature and applying the gas under pressure to the softened metal of the brazing core of the sandwich sheet over the unconfined areas for a period of time sufficient to separate the sheets and expand the sheets to fill the mold cavity, exhausting the gas pressure applied to the sandwich sheet, and removing the sandwich sheet from the dies.

8. The method of fabricating an integral, chambered sheet metal laminate from an all-aluminous sandwich sheet constituted by at least two aluminum sheets integrally bonded together over opposed facial areas thereof by an interlayer of an aluminum base brazing alloy having a melting point lower than the aluminum sheets, the method comprising placing the sandwich sheet between opposed dies providing positive confinement against separation of the sandwich sheet except for a selected area thereof, heating the sandwich sheet above the melting point of the interlayer alloy but below the melting point of the aluminum sheets, and disrupting the bond provided by the interlayer over the selected area of the sandwich sheet by introducing gas under pressure between the aluminum sheets in communication with the selected area of the sandwich sheet while maintaining the sheets above the melting point of the interlayer alloy, thereby to separate the aluminum sheets within the selected area.

9. The method of fabricating an integral sheet metal laminate of claim 1, wherein the metal sheets of the sandwich sheet are aluminum.

10. The method of fabricating an integral sheet metal laminate of claim 1, wherein the metal sheets of the sandwich sheet are aluminum and the brazing core of the sandwich sheet is an aluminum alloy.

11. The method of fabricating an integral sheet metal laminate of claim 1, wherein the metal sheets of the sandwich sheet are aluminum and the brazing core of the sandwich sheet is a metal of the class consisting of zinc and alloys thereof.

12. The method of fabricating an integral sheet metal laminate of claim 1, wherein the fluid is a gas which has been heated to substantially brazing temperature.

13. The method of fabricating the integral, chambered sheet metal laminate of claim 8, wherein the interlayer is an aluminum-silicon alloy.

14. In a method of manufacturing a hollow metal structure, the steps of: inserting in tight relationship between dies a metal laminate containing an intermediate layer having a lower melting point than the melting point of the outer layers and a capability to bond said outer layers together under heat; heating said laminate to at least approximately the melting point of said intermediate layer but below the melting point of said outer layers; shortly thereafter, introducing a source of fluid pressure into said intermediate layer in such manner as to place said source in a region of said laminate in which the configuration of said dies permits expansion of said outer layers and applying sufficient fluid pressure through said source into said intermediate layer, while said laminate is maintained at a temperature of at least approximately the melting point of said intermediate layer, to expand said outer layers by internal fluid pressure where the configuration of said dies permits such expansion; and releasing said fluid pressure, removing the resulting structure from the dies, and immediately allowing said structure to cool, whereby said outer layers are bonded with said intermediate layer in regions of said laminate in which the configuration of said dies does not permit expansion of said outer layers.

15. A method of manufacturing a hollow metal structure which comprises the steps of: inserting in tight relationship between dies a multilayer metal laminate having outer layers composed primarily of aluminum and at least one inner layer composed of a material having a substantially lower melting point than the melting point of said outer layers and a capability of bonding under heat with said outer layers; heating said laminate to at least approximately the melting point of said inner layer but below the melting point of said outer layers; shortly thereafter, introducing, while said laminate is maintained at a temperature of at least approximately the melting point of said inner layer, into said inner layer in a region of said laminate in which the configuration of said dies permits expansion of said outer layers sufficient fluid pressure to expand said outer layers by internal forming pressure where the configuration of said dies permits such expansion; and immediately allowing the resulting structure to cool, whereby said outer layers are bonded together in regions of said laminate in which the configuration of said dies does not permit expansion of said outer layers.

16. A method of manufacturing a hollow metal structure which comprises the steps of: inserting in tight relationship between dies a metal composite containing an intermediate portion having a substantially lower melting point than the melting point of the outer portions of said composite and having a capability to bond under heat with said outer portions; heating said composite to at least approximately the melting point of said intermediate portion, but below the melting point of said outer portions; shortly thereafter, introducing into said intermediate portion in a region of said composite in which the configuration of said dies permits expansion of said outer portions sufficient fluid pressure to expand said outer portions, by internal fluid pressure, where the configuration of said dies permits such expansion; and immediately allowing the resulting structure to cool, whereby said outer portions are bonded to said inner portion in regions of said composite in which the configuration of said dies does not permit expansion of said outer portions.

17. In a method of manufacturing a hollow metal structure, the steps of: inserting in tight relationship between dies a metal laminate containing an intermediate layer having a lower melting point than the melting point of the counter layers and a capability to bond said outer layers together under heat; heating said laminate to at least approximately the melting point of said intermediate layer but below the melting point of said outer layers; introducing a source of fluid pressure into said intermediate layer in such manner as to place said source in a region of said laminate in which the configuration of said dies permits expansion of said outer layers and applying sufficient fluid pressure through said source into said intermediate layer, while said laminate is maintained at a temperature of at least approximately the melting point of said intermediate layer, to expand said outer layers by internal fluid pressure where the configuration of said dies permits such expansion, whereby said outer layers are bonded with said intermediate layer in regions of said laminate in which the configuration of said dies does not permit expansion of said outer layers.

18. A method of fabricating an integral chambered sheet metal laminate from an all-aluminous sandwich sheet made up of two aluminum sheets integrally bonded together by an interlayer of an aluminum alloy having a melting point lower than the outside aluminum sheets, said method comprising placing the sandwich sheet between opposed dies, said dies having at least one cavity therein, heating the sandwich sheet above the melting point of the interlayer but below the melting point of the outer layers, and introducing gas under pressure into said sandwich sheet while maintaining the sandwich sheet above the melting point of the interlayer, thereby to expand at least one outer sheet into a die cavity.

19. A method of fabricating an integral chambered sheet metal laminate from an all-aluminous sandwich sheet made up of two aluminum sheets integrally bonded together by a metal interlayer having a melting point lower than the outside aluminum sheets, said method comprising placing the sandwich sheet between opposed dies, said dies having at least one cavity therein, heating the sandwich sheet above the melting point of the interlayer but below the melting point of the outer layers, and introducing gas under pressure into said sandwich sheet while maintaining the sandwich sheet above the melting point of the interlayer, thereby to expand at least one outer sheet into a die cavity.

20. In a method of manufacturing a hollow metal structure the steps of: inserting in tight relationship between outer, restricting dies a bonded metal laminate containing an intermediate layer having a lower melting point than the melting point of the outer layers, at least one of said restricting dies containing internal configurations to permit expansion of said laminate; applying sufficient pressure to said dies to prevent disruption of the laminate during the hereinafter specified expanding operation over the facial areas of the dies which do not contain internal configurations; heating said laminate to at least approximately the melting point of said intermediate layer but below the melting point of said outer layers; introducing a source of fluid pressure into said intermediate layer in such a manner as to place said source in a region of said laminate in which the configuration of said dies permits expansion of at least one outer layer; and applying sufficient fluid pressure through said source into said intermediate layer while said laminate is maintained at a temperature of at least approximately the melting point of said intermediate layer to expand said outer layers by internal fluid pressure where the configuration of said dies permits such expansion; releasing said fluid pressure and removing the resulting structure from the dies, whereby said outer layers are bonded with said intermediate layer in regions of said laminate in which the configuration of said dies does not permit expansion of said outer layer.

References Cited in the file of this patent

UNITED STATES PATENTS

| 1,685,388 | White | Sept. 25, 1928 |
| 2,366,164 | Weick | Jan. 2, 1945 |
| 2,514,469 | Burkhardt | July 11, 1950 |
| 2,646,259 | Powell | July 21, 1953 |
| 2,646,971 | Raskin | July 28, 1953 |
| 2,732,615 | Sandberg | Jan. 31, 1956 |
| 2,740,188 | Simmons | Apr. 3, 1956 |
| 2,779,086 | Rieppel et al. | Jan. 29, 1957 |

FOREIGN PATENTS

| 695,640 | Great Britain | Aug. 12, 1953 |

OTHER REFERENCES

"Fabricating Aluminum Radiators," pub. in magazine "Steel," Dec. 16, 1946, p. 102 relied on.

UNITED STATES PATENT OFFICE
CERTIFICATE OF CORRECTION

Patent No. 3,018,543 January 30, 1962

Edward G. Beck

It is hereby certified that error appears in the above numbered patent requiring correction and that the said Letters Patent should read as corrected below.

Column 13, line 8, for "counter" read -- outer --.

Signed and sealed this 5th day of June 1962.

(SEAL)
Attest:

ERNEST W. SWIDER
Attesting Officer

DAVID L. LADD
Commissioner of Patents